(12) United States Patent
Banda (10) Patent No.: US 9,342,354 B2
(45) Date of Patent: May 17, 2016

(54) SYSTEMS AND METHODS FOR PROVIDING SAFE CONFLUENCE MODALITY

(71) Applicant: Samsung Electronics Co., Ltd., Suwon-si, Gyeonggi-do (KR)

(72) Inventor: Gourinath Banda, Begumpet Hyderabad (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 290 days.

(21) Appl. No.: 14/174,285

(22) Filed: Feb. 6, 2014

(65) Prior Publication Data

US 2014/0223441 A1 Aug. 7, 2014

(30) Foreign Application Priority Data

Feb. 7, 2013 (IN) .............................. 359/DEL/2013

(51) Int. Cl.
*G06F 9/46* (2006.01)
*G06F 9/48* (2006.01)
*H04W 4/00* (2009.01)

(52) U.S. Cl.
CPC .. *G06F 9/48* (2013.01); *H04W 4/00* (2013.01)

(58) Field of Classification Search
None
See application file for complete search history.

(56) References Cited

U.S. PATENT DOCUMENTS

| | | | |
|---|---|---|---|
| 2009/0036108 A1* | 2/2009 | Cho | G06F 9/4843 455/418 |
| 2012/0009906 A1* | 1/2012 | Patterson | H04M 1/72519 455/414.1 |
| 2013/0076659 A1* | 3/2013 | Miyaji | G06F 3/0482 345/173 |
| 2013/0196595 A1* | 8/2013 | Byrne | H04W 52/0251 455/41.1 |
| 2013/0210358 A1* | 8/2013 | Chou | H04M 1/7253 455/41.2 |

* cited by examiner

*Primary Examiner* — Dong Kim
(74) *Attorney, Agent, or Firm* — Jefferson IP Law, LLP (57) ABSTRACT

A system and method for providing a safe confluence modality in a mobile computing device are provided. The system and method include determining an application switch between a primary application and a secondary application, identifying the application switch as a Non-User Triggered Application (NUTA) switch based on the primary application and the secondary application, the NUTA switch corresponding to the application switch initiated by a non-user of the mobile computing device and capturing a user interaction provided after the NUTA switch.

15 Claims, 4 Drawing Sheets

SYSTEMS AND METHODS FOR PROVIDING SAFE CONFLUENCE MODALITY

CROSS-REFERENCE TO RELATED APPLICATION(S)

This application claims the benefit under 35 U.S.C. §119(a) of an Indian patent application filed on Feb. 7, 2013 in the Indian Patent Office and assigned Serial number 359/DEL/2013, the entire disclosure of which is hereby incorporated by reference.

TECHNICAL FIELD

The present disclosure relates to computing devices. More particularly, the present disclosure relates to mobile computing devices providing multi-tasking capabilities.

BACKGROUND

Mobile computing devices, such as laptops, computers, tablets, and mobile phones, have seemingly become a ubiquitous part of today's lifestyle. With increasing demand for more and more processing capability and additional functions for use by users, the mobile computing devices are now being configured with state of the art technologies, such as dual and multiple processors, to meet the demands and provide a remarkable user experience.

Along with the support provided by more efficient and improved hardware to the mobile computing devices, the remarkable user experience is also made possible by the use of more and more sophisticated and complex applications. Many such applications are provided by the manufacturer of the mobile communicating device, while many others are later installed by the users to customize their mobile computing devices.

Installation and execution of applications on the mobile computing device is often supported by an operating system, which abstracts the hardware, by providing an interface to the capabilities of the computing device. Present day operating systems provide an environment where several applications may run concurrently, with a minimal of interference between them, but with support for safe data sharing.

Accordingly, there is a need for systems and methods for providing safe confluence modality in a mobile computing device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide systems and methods for providing safe confluence modality. This summary is not intended to identify essential features of the claimed subject matter nor is it intended for use in determining or limiting the scope of the claimed subject matter.

In accordance with an aspect of the present disclosure, a method for providing a safe confluence modality in a mobile computing device is provided. The method includes determining an application switch between a primary application and a secondary application, the primary application being switched from a 'foreground' application to one of a 'background' application, and the secondary application being switched from one of the background application to the 'foreground' application, identifying the application switch to be a Non-User Triggered Application (NUTA) switch based on the primary application and the secondary application, the NUTA switch corresponding to the application switch initiated by a non-user of the mobile computing device, capturing a user interaction provided after the NUTA switch.

In accordance with another aspect of the present disclosure a system for providing a safe confluence modality in a mobile computing device. The system includes a processor, a switch identification module coupled to the processor, the switch identification module configured to determine an application switch between a primary application and a secondary application, the primary application being switched from a 'foreground' application to one of a 'background' application, and the secondary application being switched from one of the background application to the 'foreground' application, and identify the application switch as a Non-User Triggered Application (NUTA) switch based on the primary application and the secondary application, the NUTA switch corresponding to the application switch initiated by a non-user of the mobile computing device, a time determination module coupled to the processor, the time determination module configured to determine a confluence time associated with the application switch, the confluence time being indicative of a time period in which the user interactions are identified as Out-Of-Sync Interactions (OOSI), and an interaction capturing module coupled to the processor, the interaction capturing module configured to capture a user interaction provided within the confluence time after the NUTA switch.

In accordance with another aspect of the present disclosure a non-transitory computer-readable storage medium storing instructions that, when executed, cause at least one processor to perform the method of providing a safe confluence modality in a mobile computing device is provided. The method includes identifying a switch event caused by a non-user event in the mobile computing device, switching a first application running in a foreground mode of the a mobile computing device to a background mode and a second application running in the background mode of the a mobile computing device to the foreground mode based upon the switch event, and recording a user interaction with the mobile computing device for a period of time, the period of time being determined by an association between the first application and the second application.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Systems and methods for providing safe confluence modality in a mobile computing device are described herein. The methods may be implemented in various mobile computing devices capable of providing multi-tasking functions. Although the description herein is with reference to smart-phones, the methods and systems may be implemented in other mobile computing devices, albeit with a few variations, as will be understood by a person skilled in the art.

Mobile computing devices, such as smart-phones, tablet PCs, and other handheld devices have become popular and important to the daily activities of many users. Nowadays, users are increasingly relying upon these mobile computing devices as an integral tool in the performance of a wide-range of personal and work-related tasks. In response, mobile computing devices like smart-phones have evolved into complex computing devices with equally complex computer hardware and software.

Mobile computing devices provide various functions, including accessing and displaying websites, sending and receiving e-mails, taking and displaying photographs and videos, playing music and other forms of audio, etc. These, and numerous other functions, are generally performed by applications that run on top of the mobile computing device's operating system.

Typically, while the operating system of the mobile computing device runs multiple applications, at any given instance there is essentially one selected application which has control over peripheral hardware components like the display and keys, of the mobile computing device. Such applications are generally referred to as 'foreground' applications while the other applications, running simultaneously on the operating system of the mobile computing device without the control over peripheral hardware components, are referred to as 'background' applications. Generally, the 'background' applications are associated with a lower priority of execution and are operated when they are invoked either by the user or by the operating system.

While there are multiple 'background' applications running on an operating system of the mobile computing device, either the user, the operating system, or one of the 'background' application may initiate a switch between one of the 'background' application and the 'foreground' application. In certain situations, the operating system may sua sponte invoke one of the 'background' applications to become the 'foreground' application, thereby forcing the previous 'foreground' application to become one of the 'background' application. Further, in some situations, the operating system may initiate an application and provide the application with 'foreground' status while forcing the previous 'foreground' application to become one of the 'background' applications. For example, in smart-phones, while the user is browsing Internet through a web browsing application, the operating system may invoke caller application to indicate to the user an incoming call is in progress and force the web browsing application to become a 'background' application.

In some other situations, one of the 'background' applications may invoke another application as the 'foreground' application while forcing the previous 'foreground' application to become one of the 'background' applications. Furthermore, in certain scenarios, the 'foreground' application may either crash or exit due to an unexpected failure causing one of the 'background' applications to become the 'foreground' application, thereby causing a switch among the application.

Generally, the switch between applications from one of the 'background' application to the 'foreground' application and vice versa occurs swiftly within a fraction of second. Also, along with the switching of the application, the switching between the control over the peripheral devices occurs swiftly. While the switch between applications occurs, the time taken to switch between applications is far less than reaction time of users. Also, with increasing processing capability of the hardware components in the mobile communication device, the difference between the switching time of applications and reaction time of users has been increasing.

While there is a difference between the switching time of applications and the reaction time of users, more often than not, there is a jitter or latency in user response leading to Out-Of-Sync Interaction (OOSI). In other words, the users may provide a response for a primary application which may be running as the 'foreground' application. However, due to the delayed response time of users, by the time the response may actually be received by the mobile computing device, the operating system may have forced some other secondary application to become the 'foreground' application. Therefore, the response may be executed on to the secondary application rather that being executed on the primary application for which it was actually intended. Hence, such OOSI by the user may lead to unintended operations and accidental execution of involuntary functions.

According to an implementation of the present subject matter, systems and methods for providing safe confluence modality in a mobile computing device during switching of application are described herein. On one hand, the described methods provide safe confluence modality to avoid OOSI and unintended operations, on the other hand, provide seamless experience to users during unintentional switching between applications which are running on the mobile communication device. According to the described implementation of the present subject matter, the switching between applications may be monitored for the communication device to determine an unintended or system invoked switch to provide the safe confluence modality. It would be understood that the applications may include, and are not limited to, native applications installed by the manufacturer of the mobile communication device and non-native applications installed by the user on the mobile communication device.

In operation, switching between applications is monitored to identify a switch between the 'foreground' application and one of the 'background' applications to determine whether the switch is based on a Non-User Triggered Application (NUTA) switch. The NUTA switch may be understood as a switch between applications that has not been initiated by the user of the mobile communication device. It would be understood that the NUTA switch may either be initiated by the operating system of the mobile computing device, by another 'background' application with application switching rights or, by force closure of the 'foreground' application due to a crash or unexpected failure.

Upon determining an occurrence of the NUTA switch, a safe confluence modality may be provided to the users by capturing any interaction of the user, such as the OOSI occurring during the NUTA switch. The captured interactions of the user may be directed to the application that has been forced to become one of the 'background' applications. In another implementation, if the NUTA switch is determined to have occurred due to force closure of the 'foreground' application, the captured OOSI may be discarded and not provided to the any application at all. Based on the identification of the NUTA switch and capturing of the OOSI, an unintended operation may be avoided and the users may be provided with a seamless experience.

Therefore, the above described methods allow switching of the applications of a mobile computing device while preserving user interactions during the switch of application. Further, the implementations of the described methods ensure that there is no loss of data or in appropriate execution of an interaction onto an unintended application.

It should be noted that the description merely illustrates the principles of the present subject matter. It will thus be appreciated that various arrangements may also be employed that, although not explicitly described herein, embody the principles of the present subject matter and are included within its spirit and scope. Furthermore, all examples recited herein are principally intended expressly to be only for explanation purposes to aid the reader in understanding the principles of the present subject matter, and are to be construed as being without limitation to such specifically recited examples and conditions. Moreover, all statements herein reciting principles, aspects, and embodiments of the present disclosure, as well as specific examples thereof, are intended to encompass equivalents thereof. The manner in which the methods shall be implemented onto various systems has been explained in details with respect to the FIGS. 1-3. While aspects of described systems and methods may be implemented in any number of different computing systems, transmission environments, and/or configurations, the embodiments are described in the context of the following system(s).

Figure 1:
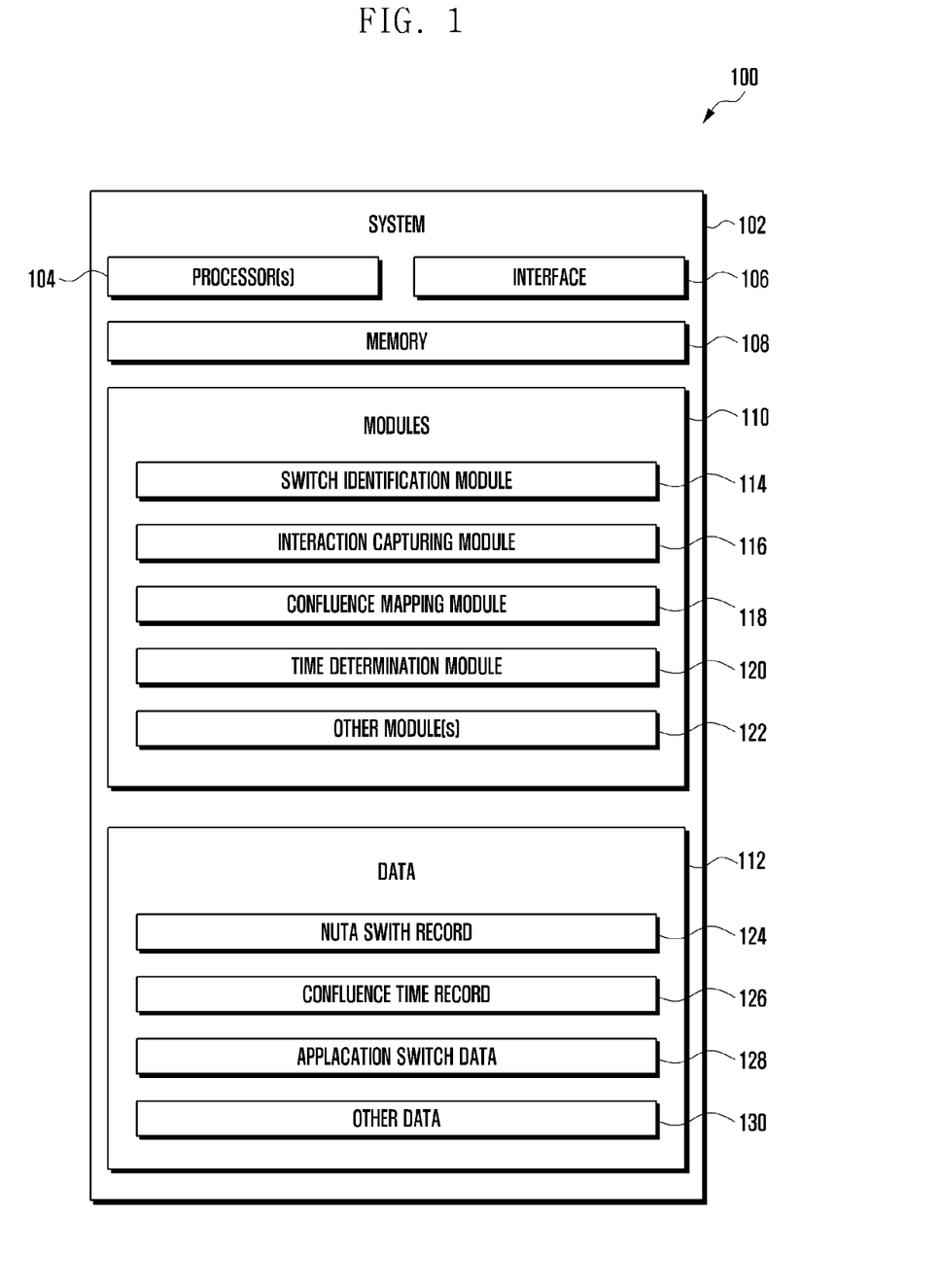
FIG. 1 schematically illustrates a system for a mobile computing device providing a safe confluence modality according to an embodiment of the present disclosure.

FIG. 1 illustrates a system 102, for providing safe confluence modality in a mobile computing device according to an embodiment of the present disclosure.

Figure 2A:
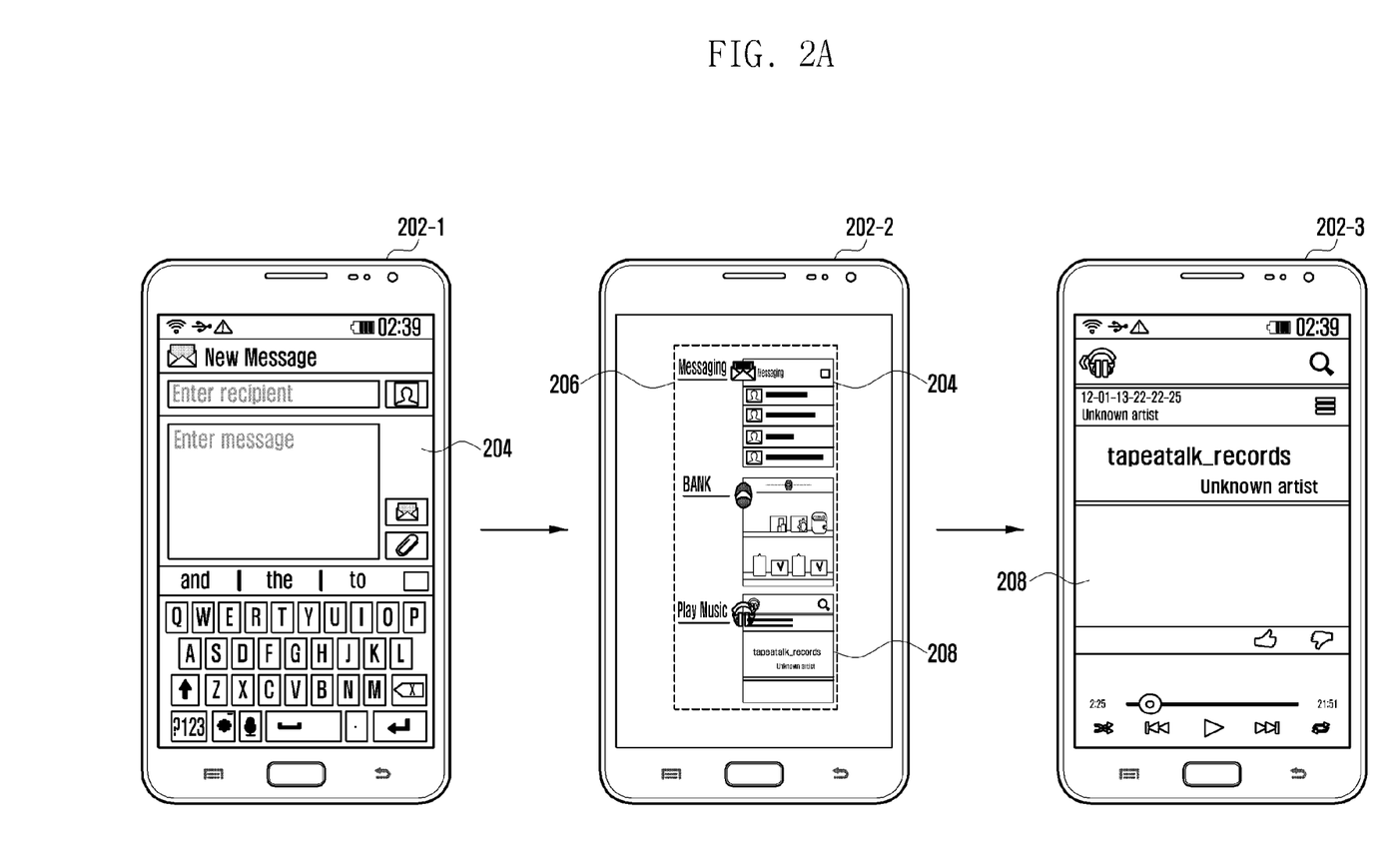
FIG. 2A illustrates a user triggered application switch according to an embodiment of the present disclosure.
Figure 2B:
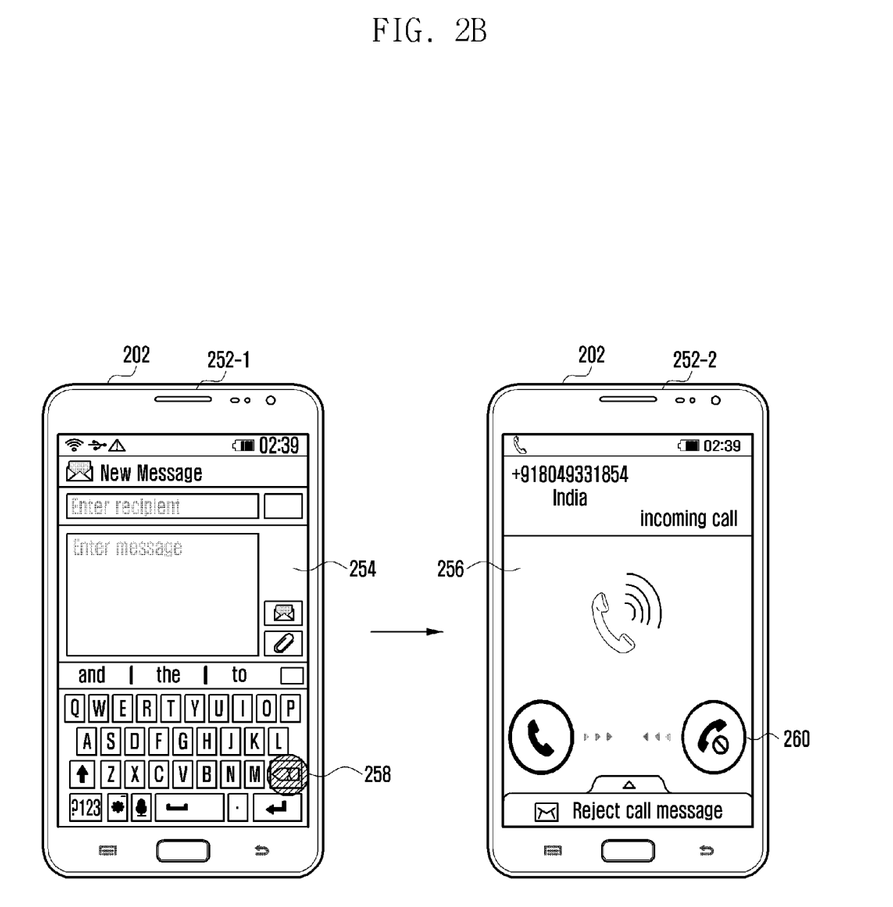
FIG. 2B illustrates a Non-User Triggered Application (NUTA) switch according to an embodiment of the present disclosure.

FIGS. 2A and 2B illustrate an application switching instance on a mobile computing device according to an embodiment of the present disclosure. The system 102 described herein, may be implemented in any mobile computing device, comprising a variety of devices including, but not limited to, hand-held devices, laptops or other portable computers, tablet computers, Phablets, mobile phones, PDAs, Smartphones, and the like. The system 102 may interface with multiple applications, running on the mobile computing device, through the operating system of the mobile computing device.

Referring to FIG. 1, the system 102 may be implemented in a mobile computing device 100 where the operating system of the mobile computing device is capable of providing multi-tasking capability. Further, the operating system may also be capable of switching control of peripheral hardware components between one application and another application based on priority of the applications.

In one implementation, the system 102 includes processor (s) 104. The processor 104 may be implemented as one or more microprocessors, microcomputers, microcontrollers, digital signal processors, central processing units, state machines, logic circuitries, and/or any devices that manipulate signals based on operational instructions. Among other capabilities, the processor(s) 104 are configured to fetch and execute computer-readable instructions stored in a memory 108.

Also, the system 102 may include interface(s) 106. The interfaces 106 may include a variety of software and hardware interfaces that allow the system 102 to interact with different applications and the peripheral hardware components of the mobile computing device. The interfaces 106 may facilitate multiple communications within a wide variety of protocol types including, operating system to application communication, inter process communication, etc.

In another embodiment of the present disclosure, the system 102 may also include a memory 108. The memory 108 may be coupled to the processor 104. The memory 108 may include any computer-readable medium known in the art including, for example, volatile memory, such as Static Random Access Memory (SRAM) and Dynamic Random Access Memory (DRAM), and/or non-volatile memory, such as Read Only Memory (ROM), erasable programmable ROM, flash memories, hard disks, optical disks, and magnetic tapes.

Further, the system 102 may include modules 110 and data 112. The modules 110 and the data 112 may be coupled to the processors 104. The modules 110, amongst other things, include routines, programs, objects, components, data structures, etc., which perform particular tasks or implement particular abstract data types. The modules 110 may also be implemented as, signal processor(s), state machine(s), logic circuitries, and/or any other device or component that manipulate signals based on operational instructions.

Further, the modules 110 may be implemented in hardware, instructions executed by a processing unit, or by a combination thereof. The processing unit may comprise a computer, a processor, a state machine, a logic array or any other suitable devices capable of processing instructions. The processing unit may be a general-purpose processor that executes instructions to cause the general-purpose processor to perform the required tasks or, the processing unit may be dedicated to perform the required functions.

In another aspect of the present disclosure, the modules 110 may be computer-readable instructions which, when executed by a processor/processing unit, perform any of the described functions. The machine-readable instructions may be stored on an electronic memory device, hard disk, optical disk or other machine-readable storage medium or non-transitory medium.

In an implementation, the modules 110 includes a switch identification module 114, interaction capturing module 116, confluence mapping module 118, time determination module 120, and other modules 122. The other modules 122 may include programs or coded instructions that supplement applications or functions performed by the system 102. In said implementation, the data 112 includes NUTA switch record 124, confluence time record 126, application switch data 128, and other data 130. The other data 130 amongst other things, may serve as a repository for storing data that is processed, received, or generated as a result of the execution of one or more modules in the modules 110. Although the data 112 is shown internal to the system 102, it may be understood that the data 112 may reside in an external repository (not illustrated in the figure), which may be coupled to the system 102. The system 102 may communicate with the external repository through the interface(s) 106 to obtain information from the data 112.

As mentioned before, the system 102 is configured to provide safe confluence modality for mobile communication devices. According to the present disclosure, the confluence arises in situations where there is a switch between a 'foreground' application and a 'background' application. The switch, as mentioned earlier, may be initiated by the user of the mobile communication device, the operating system of mobile communication device, one of the 'background' applications, or due to force closure of the 'foreground' application. In said implementation, the system 102 includes a switch identification module 114. The switch identification module 114 is configured to identify any switch between two applications of the mobile computing device.

The application switch based on user inputs may be a User Triggered Application (UTA) switch. For example, the user of a mobile communication device might be using an application to compose and send Short Service Messages (SMS), such as a messaging app. During the use of this application, the user may wish to listen to music while typing the content of the SMS. In such a scenario, the user would generally initiate another application for music playback.

FIG. 2A illustrates a UTA switch scenario where the user switches from the messaging app to the application allowing music playback according to an embodiment of the present disclosure.

Referring to FIG. 2A, three different instances of the mobile computing device 202 are illustrated as 202-1, 202-2, and 202-3. The instance of the mobile computing device 202-1 illustrates the messaging app being executed. The instance of the mobile computing device 202-2 illustrates a user initiated switch scenario where the user may choose to switch to any of the 'background' applications. Based on choice of the user, the user may choose from the list of applications 206. From the list of application depicted in 206, the user may choose a play music application 208 to play music. Finally, the instance of the mobile computing device 202-3 illustrates the switched application being run based on user choice. Therefore, based on the user input, the mobile computing device 202 switches from the messaging app 204 to play music application 208.

While the user initiates and selects the music to be played, the messaging app 204 may be shifted to become one of the 'background' applications 206. It would be understood by those skilled in the art that the messaging app 204 may not be closed during this process since the operating system of the mobile computing device may allow multi-tasking capabilities where multiple applications may be run in parallel and utilize the processing resource of the mobile computing device. Further, during this process of switching between the messaging app and the application for music playback, the control of the mobile computing device's peripheral hardware components may also be switched between the applications.

In one implementation of the present subject matter, the switch identification module 114 is configured to identify application switches between any two applications. In operation, the switch identification module 114 may determine the application switch either based on interaction with the operating system of the mobile computing device, or based on identification of change in functionality of the peripheral hardware components.

As would be understood by those skilled in the art, the peripheral hardware components of the mobile computing device are associated with specific interaction functionality as required by the user interface of the 'foreground' application. As soon as the 'foreground' application is switched to any other application, the functionality associated with the peripheral hardware components is also switched and the peripheral hardware components represent the interaction functionality of the new 'foreground' application. Therefore, each application capable of being run on the mobile computing device has its own set of functions corresponding to the available peripheral hardware components which changes with the switch of the 'foreground' application.

In the above mentioned scenario where the user switches between the messaging app 204 and the application providing music playback functionality, the switch identification module 114 may determine the switch based on the change in functionality of the peripheral hardware components. It would be understood that the switch identification module 114 may also determine the switch based on interaction with the operating system of the mobile computing device. In one implementation of the present subject matter, the operating system of the mobile computing device may provide an input to the switch identification module 114 wherever a switch between applications occurs to flag a change in functionality of the peripheral hardware components.

Apart from the UTA switch between applications, there might be instances when the application switch is a NUTA switch. In case the application switch is a NUTA switch, the switch between the applications may be initiated by one of, the operating system of the mobile computing device due to overriding priority of another application, one of the background application running on the mobile computing device, and the operating system of the mobile computing device due to forced closure of the 'foreground' application. As described for the UTA switch, in situations of occurrence of the NUTA switch also, the control of the peripheral hardware components shifts from the 'foreground' application to the new 'foreground' application. Furthermore, along with the switch in control, the functionality associated with the peripheral hardware components is also switched and the peripheral hardware components represent the interaction functionality of the new 'foreground' application.

FIG. 2B illustrates a NUTA switch according to an embodiment of the present disclosure.

Referring to FIG. 2B, a NUTA switch is depicted illustrated by an operating system initiated switch among application. FIG. 2B depicts two instances of the mobile computing device 202 as 252-1 and 252-2. The instance 252-1 depicts a user utilizing the messaging app 254. During this use of the messaging app 254, the operating system of the mobile computing device 202 may trigger an application switch to provide notification of an incoming call to the user. For this purpose, the operating system of the mobile communication device 202 may invoke a caller application 256. Since, the application switch is not triggered by the user, such an application switch depicted in FIG. 2B forms a part of the NUTA switch.

In one implementation of the present subject matter, the switch identification module 114, upon identifying the application switch, is also configured to determine whether the application switch is a NUTA switch. In said implementation, the switch identification module 114 may determine the application switch to be a NUTA switch based on the NUTA switch record 124. In said implementation, the NUTA switch record 124 may include an exhaustive combination of possibilities where a NUTA switch among applications may occur. That is, the NUTA switch record 124 may include an exhaustive combination of possible application switches, where the switch is not triggered by the user. Each combination in the NUTA switch record 124 may include a primary application and a corresponding secondary application. The primary application may refer to a 'foreground' application which may be switched with the secondary application to make the secondary application the new 'foreground' application. In one implementation of the present subject matter, the NUTA record 124 may be described as illustrated in Table 1.

TABLE 1

| Record Id. | Primary Application | Secondary Application |
|---|---|---|
| 1 | $App_i$ | $App_j$ |
| 2 | $App_k$ | $App_l$ |
| 3 | $App_a$ | $App_b$ |
| . | . | . |
| . | . | . |
| . | . | . |
| N | $App_p$ | $App_q$ |

In the above depicted Table 1, each combination is listed against a record Id., such as record Id. 1, record Id. 2, record Id. 3, . . . , and record Id. N. As described, each record has a combination of two applications, the primary application and the secondary application. For example, against record Id. 1, the application 'i' is the primary application and the application 'j' is the secondary application. This combination of applications 'i' and 'j' is defined to be a NUTA switch when there is an application switch from application 'i' to application 'j'. Hence, based on the NUTA switch record 124, the switch identification module 114 may determine whether the application switch from the primary application to the secondary application is a NUTA switch or not.

In operation, the switch identification module 114 may determine the application running as the 'foreground' application to be one of a primary application and, the application replacing the 'foreground' application to become the new 'foreground' application to be one of a secondary application. Upon identifying the primary application and the secondary application, the switch identification module 114 may search for an exact combination of these applications in the NUTA switch record 124 against a single record Id. In case the combination of the primary application and the secondary application is identified to be present in any corresponding record Id of the NUTA switch record 124, the switch identification module 114 may determine the application switch from the primary application to the secondary application to be a NUTA switch. For example, as depicted in FIG. 2B, while the application switch occurs from the messaging app 254 to the caller application 256, the switch identification module 114 may search for an entry corresponding to the scenario where against a record Id the primary application is defined to be the messaging app 254 and the secondary application is defined to be the caller application. In one implementation, upon determination of the application switch to be the NUTA switch, the switch identification module 114 may store the record Id along with the primary application and the secondary application details of the application switch in the application switch data 128.

Although it has been described that the switch identification module 114 may determine the application switch to be a NUTA switch based on the NUTA switch record 124, it would be appreciated that the switch identification module 114 may also determine the application switch to be a NUTA switch based on an input from the operating system of the mobile computing device. In such situations, whenever the operating system of the mobile computing device performs an application switch without user trigger, an indication may be provided to the switch identification module 114 to identify the application switch to be a NUTA switch.

According to an implementation of the present subject matter, upon determination of the application switch to be a NUTA switch by the switch identification module 114, the time determination module 120 may identify a confluence time associated with the application switch. Confluence time may be defined as time duration, computed from the time instance of the application switch, during which an interaction from the user may be considered as an OOSI. In other words, the confluence time period defines the maximum time duration for which any user's interaction, after the application switch, would be treated as an interaction provided for the primary application.

In one implementation of the present subject matter, the confluence time for each application switch is based on the primary and secondary application between which the allocation switch has occurred. It would be appreciated that the time taken by the mobile computing device to switch between applications may vary depending upon the applications involved. For few applications the application switch may take less time while for others, it may take a bit longer. In such situations, the confluence time may also vary based on the applications involved. To this end, the system 102 may include the confluence time record 126 that may include the value of the confluence time for each possible combination of NUTA switch. As described earlier, each possible combination of NUTA switch among applications may be defined in the NUTA switch record 124 against a specific record Id. Since the confluence time is dependent on the applications between which the application switch occurs, the confluence time record 126 may also include a value of confluence time against each record defined in the NUTA switch record 124. In one implementation of the present subject matter, the confluence time record 126 may be described as illustrated in Table 2.

TABLE 2

| Record Id. | Confluence Time |
|---|---|
| 1 | $T_{(i,j)}$ |
| 2 | $T_{(k,l)}$ |
| 3 | $T_{(a,b)}$ |
| . | . |
| . | . |
| . | . |
| N | $T_{(p,q)}$ |

As described in Table 1 illustrating the NUTA switch record, the Table 2 illustrates a confluence time against each record defined in the NUTA switch record. For example, against the record Id. 1, the NUTA switch record defined an application switch between the application 'i' and the application 'j'. Similarly, the Table 2 defines the confluence time against the record Id 1. That is, the time for which any user interaction after the application switch from application 'i' to application 'j' would be treated as an OOSI. Therefore, in one implementation, the time determination module 120 may determine the confluence time for a NUTA switch between two applications based on the confluence time record 126.

Although it has been described that the NUTA switch record and the confluence time records are defined as separate entities however, it would be understood that there may exist a single record defining the primary application, the secondary application, and the confluence time against each record. Table 3 illustrates such a record based on which, both, the switch identification module 114 may determine an application switch to be a NUTA switch and, the time determination module 120 may determine the confluence time corresponding to the application switch.

TABLE 3

| Record Id. | Primary Application | Secondary Application | Confluence Time |
|---|---|---|---|
| 1 | $App_i$ | $App_j$ | $T_{(i,j)}$ |
| 2 | $App_k$ | $App_l$ | $T_{(k,l)}$ |
| 3 | $App_a$ | $App_b$ | $T_{(a,b)}$ |
| . | . | . | . |
| . | . | . | . |
| . | . | . | . |
| N | $App_p$ | $App_q$ | $T_{(p,q)}$ |

In another implementation of the present subject matter, the time determination module 120 is configured to determine the confluence time based on real time switching time duration between two applications. In said implementation, the time determination module 120 may determine the time taken by the operating system of the mobile computing device to switch between two applications in a NUTA switch to determine a corresponding confluence time.

The confluence time for a NUTA switch may also be fixed for all application switches, irrespective of the applications involved. In such a scenario, the time determination module 120 may determine a fixed pre-determined time period as the confluence time for each application switch.

The confluence time determined by the time determination module 120, either based on the confluence time record, the real time switching duration, or fixed value, may be stored in the application switch data 128.

In one implementation of the present subject matter, upon determination of the confluence time for the application switch by the time determination module 120, the interaction capturing module 116 may capture any interaction by the user during the confluence time period. In other words, once the application switch is determined to be a NUTA switch and a confluence time for the application switch is determined, any interaction provided by the user during the determined confluence time period is considered as the interaction for the primary application rather than the currently active 'foreground' secondary application.

For example, in the NUTA switch situation depicted in FIG. 2B, in case the user has pressed the back button 258 to delete a written letter on the messaging app 254 just upon the occurrence of the NUTA switch, the user interaction would have been received by the caller application 256 instead of the messaging app 254. Further, since in this case the call disconnect interface 260 happens to appear at the same input position, the call disconnect would instead have been triggered which might have not been the intent of the user. However, to avoid such situations, the interaction capturing module 116 is configured to capture the user interaction occurring within the confluence time period of the occurrence of the NUTA switch.

In one implementation, the interaction capturing module 116 is configured to initiate a watchdog timer upon determination of an application switch to be a NUTA switch. The time period of the watchdog timer may be based on confluence time period determined for the application switch by the time determination module 120. In said implementation, any user interaction identified by the interaction capturing module 116, while the watchdog timer is still alive, is captured and identified as an OOSI. In one implementation, the captured user interactions are not provided to the secondary applications by the interaction capturing module 116.

In another implementation of the present subject matter, the confluence mapping module 118 of the system 102 is configured to map the OOSI captured by the interaction capturing module 116 to the primary application of the application switch. For example, in the above described situation of FIG. 2B, the user interaction of 258 press captured by the interaction capturing module 116 is mapped by the confluence mapping module to the messaging app. 254 rather than the caller application 256. In one implementation, the confluence mapping module 118 may determine the primary application corresponding to the application switch based on the NUTA switch record Id. stored in the application switch data 128 by the switch determination module. Based on the NUTA switch record Id, the confluence mapping module 118 may determine the corresponding primary application with respect to the secondary application currently running as the new 'foreground' application.

According to an implementation of the present subject matter, the confluence mapping module 118 may provide a safe confluence modality to the users during a NUTA switch. As would be understood by those skilled in the art, once the watchdog time implemented by the interaction capturing module 116 expires, the user interactions may not be captured and not provided to the primary application. Rather, the user interactions received after the expiration of the watchdog timer may directly be provided to the secondary application, such as answering or dropping the call 260.

Based on the implementation of the above described system 102 and the stated methods, a safe confluence modality may be provided to users to handle OOSIs occurring during the NUTA switches. The implementation may allow prevention of data loss due to OOSIs and may also enhance the seamless application switching experience for users.

Figure 3:
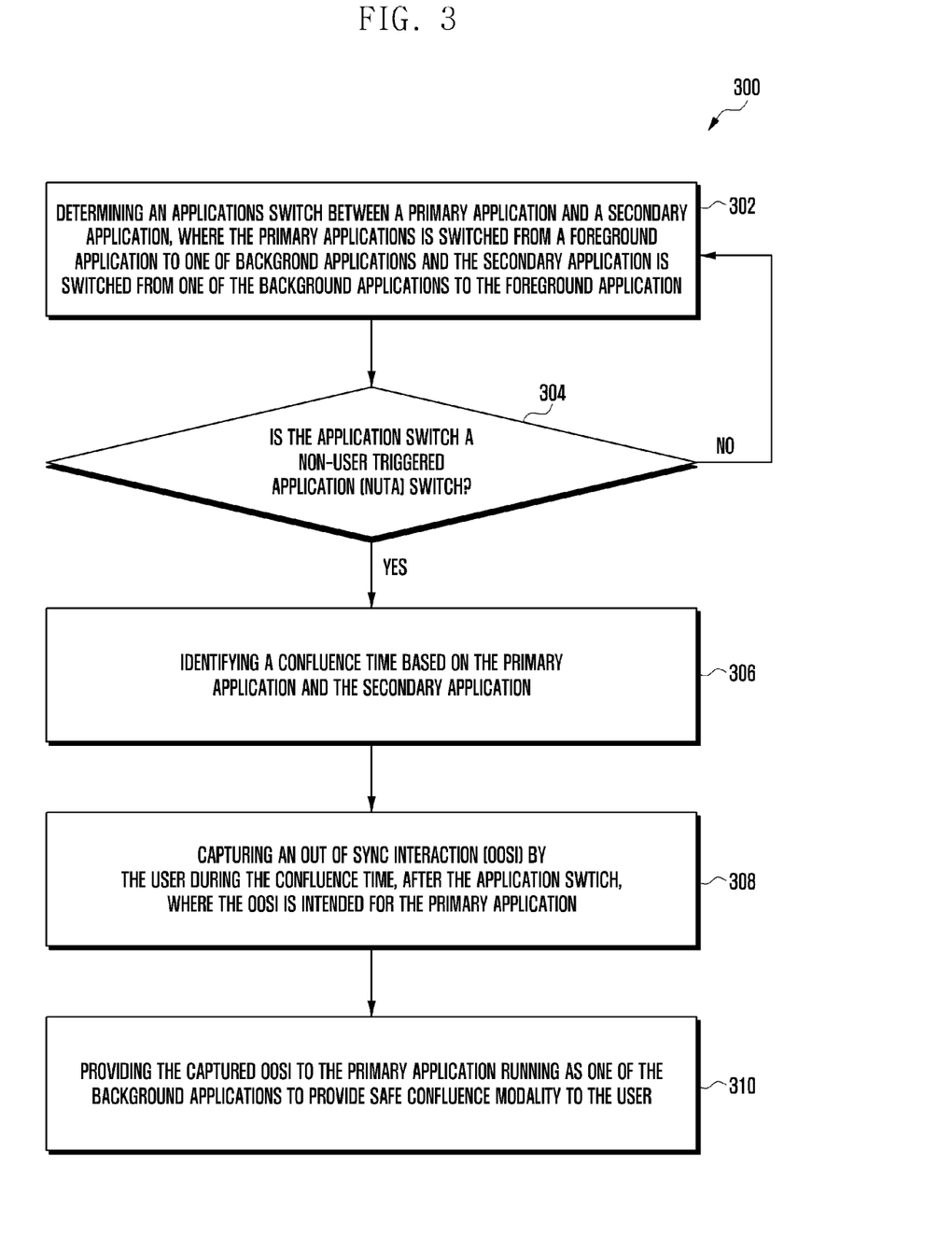
FIG. 3 illustrates a method for providing a safe confluence modality to users of a mobile computing device according to an embodiment of the present disclosure.

FIG. 3 illustrates a method to provide a safe confluence modality to users during a NUTA switch in a mobile computing device according to an embodiment of the present disclosure. The order in which the method 300 is described is not intended to be construed as a limitation, and any number of the described method blocks may be combined in any order to implement the method, or any alternative methods. Additionally, individual blocks may be deleted from the method without departing from the spirit and scope of the subject matter described herein. Furthermore, the method may be implemented in any suitable hardware, software, firmware, or combination thereof.

The methods may be described in the general context of computer executable instructions. Generally, computer executable instructions may include routines, programs, objects, components, data structures, procedures, modules, functions, etc., that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

A person skilled in the art will readily recognize that steps of the methods may be performed by programmed computers and communication devices. Herein, some embodiments are also intended to cover program storage devices, for example, digital data storage media, which are machine or computer readable and encode machine-executable or computer-executable programs of instructions, where said instructions perform some or all of the steps of the described methods. The program storage devices may be, for example, digital memories, magnetic storage media, such as a magnetic disks and magnetic tapes, hard drives, or optically readable digital data storage media. The embodiments are also intended to cover both communication network and communication devices configured to perform said steps of the exemplary methods.

FIG. 3 illustrates a method for providing a safe confluence modality to users of a mobile computing device according to an embodiment of the present disclosure.

Referring to the FIG. 3, in the method 300 at operation 302, a processor 104 may perform an application switch between a primary application and a secondary application of a mobile computing device is determined. In one implementation, the primary application is switched from a 'foreground' application to one of background applications and the secondary application is switched from one of the 'background' applications to the 'foreground' application. Further, the application switch may occur either based on user trigger or, based on non-user trigger. In said implementation, the primary application and the secondary application may either be a native or a non-native application running on the mobile communication device.

At operation 304, the processor 104 may determine whether the application switch is a NUTA switch or not. A NUTA switch may occur in situations when either, an operating system of the mobile computing device invokes another application to run as the 'foreground' application, the operating system switches one of the 'background' applications to the 'foreground' application when the already running 'foreground' application force closes due to a crash or un-expected failure, or one of the 'background' application invokes an application to become the 'foreground' application. In one implementation, the occurrence of the NUTA switch is determined based on a pre-defined exhaustive list of possible NUTA switches between the applications of the mobile computing device. In case the determination at operation 304 is positive, the control flows to operation 306 ('YES' branch), however, in case where the determination at the operation 304 is negative, the control flows back to the operation 302 ('NO' branch).

At operation 306, the processor 104 may identify a confluence time based on the primary application and the secondary application involved in the application switch is determined. The confluence time may denote the time period after the application switch during which any user interaction may be identified as an Out-Of-Sync Interaction (OOSI). In one implementation, the confluence time may be based on the applications involved in the application switch where for each corresponding pair of applications, the confluence time is pre-determined.

At operation 308, an OOSI identified during the confluence time, after the application switch is captured. In one implementation, the captured OOSI is meant for the primary application, sent by a user of the mobile computing device. In said implementation, the expiry of the confluence time may be monitored based on a watchdog timer where the limit if the timer is based on the value of the confluence time.

At operation 310, the captured OOSI is provided to the primary application which is running as one of the background applications. Providing the OOSI to the primary application provide safe confluence modality to the user during the NUTA switch.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for providing a safe confluence modality in a mobile computing device, the method comprising:
   determining an application switch between a primary application and a secondary application, the primary application being switched from a 'foreground' application to one of a 'background' application, and the secondary application being switched from one of the background application to the 'foreground' application;
   identifying the application switch to be a Non-User Triggered Application (NUTA) switch based on the primary application and the secondary application, the NUTA switch corresponding to the application switch initiated by a non-user of the mobile computing device;
   determining a confluence time for the NUTA switch;
   capturing a user interaction during the determined confluence time provided after the NUTA switch; and
   providing the captured user interaction to the primary application while the secondary application is running as the 'foreground' application.

2. The method as claimed in claim 1, wherein the capturing the user interaction comprises:
   mapping functions of peripheral hardware components of the mobile computing device to the secondary application running as the 'foreground' application; and
   capturing the user interaction provided to the primary application running as one of the 'background' applications.

3. The method as claimed in claim 1, wherein the capturing is based on a confluence time associated with the application switch, and wherein the confluence time is indicative of a time period in which the user interactions are identified as out-of-sync interactions.

4. The method as claimed in claim 3, wherein the confluence time is based on the primary application and the secondary application.

5. The method as claimed in claim 1, wherein the NUTA switch is triggered by an operating system of the mobile computing device.

6. The method as claimed in claim 1, wherein the determining is based on an input received from an operating system of the mobile computing system.

7. The method as claimed in claim 1, wherein the providing is based on a confluence time associated with the application switch, and wherein the confluence time is based on the primary application and the secondary application.

8. A system for providing a safe confluence modality in a mobile computing device, the system comprising:
   a processor;
   a switch identification module coupled to the processor, the switch identification module configured to:
   determine an application switch between a primary application and a secondary application, the primary application being switched from a 'foreground' application to one of a 'background' application, and the secondary application being switched from one of the background application to the 'foreground' application; and identify the application switch to be a Non-User Triggered Application (NUTA) switch based on the primary application and the secondary application, the NUTA switch corresponding to the application switch initiated by a non-user of the mobile computing device;

a time determination module coupled to the processor, the time determination module configured to determine a confluence time associated with the application switch, the confluence time being indicative of a time period in which the user interactions are identified as Out-Of-Sync Interactions (OOSI); and an interaction capturing module coupled to the processor, the interaction capturing module configured to capture a user interaction provided within the confluence time after the NUTA switch.

9. The system as claimed in claim 8, further comprising a confluence mapping module, configured to provide the captured user interaction to the primary application while the secondary application is running as the 'foreground' application.

10. The system as claimed in claim 8, wherein functions of peripheral hardware components of the mobile computing device are mapped to the secondary application running as the 'foreground' application, and wherein the interaction capturing module captures the user interaction being provided to the primary application running as one of the 'background' applications.

11. The system as claimed in claim 8, wherein the confluence mapping module is configured to determine the confluence time based on real-time switching time between the primary application and the secondary application.

12. The system as claimed in claim 8, wherein the interaction capturing module is configured to implement a watchdog time to capture the user interaction within the confluence time after the NUTA switch.

13. The system as claimed in claim 8, wherein the NUTA switch is triggered by an operating system of the mobile computing device.

14. A method of providing a safe confluence modality in a mobile computing device, the method comprising:

identifying a switch event caused by a non-user initiated event in the mobile computing device;

switching a first application running in a foreground mode of the a mobile computing device to a background mode and a second application running in the background mode of the a mobile computing device to the foreground mode based upon the switch event;

determining a confluence time for a switch event;

recording a user interaction with the mobile computing device during the confluence time; and providing the recorded user interaction to the first application while the second application is running in a foreground mode.

15. The method as claimed in claim 14, further comprising:

sending the recorded user interaction to the first application running in the background mode.

* * * * *